June 30, 1931.  J. B. HAWLEY, JR  1,812,784
BEARING LOCKING DEVICE
Filed March 20, 1929
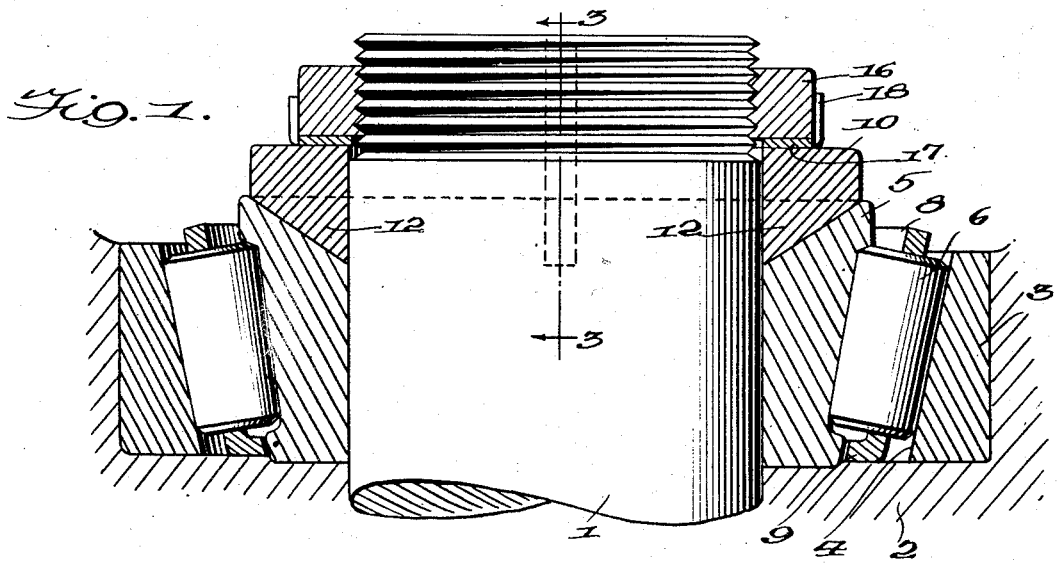
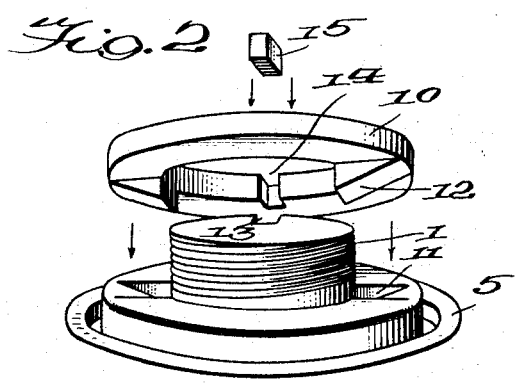
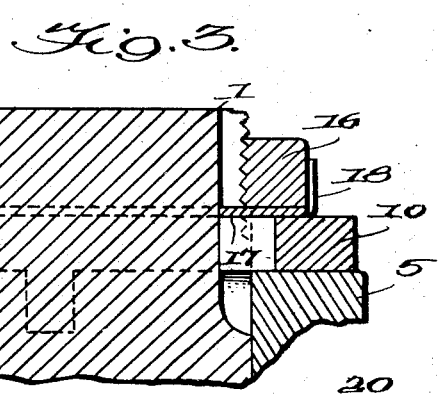
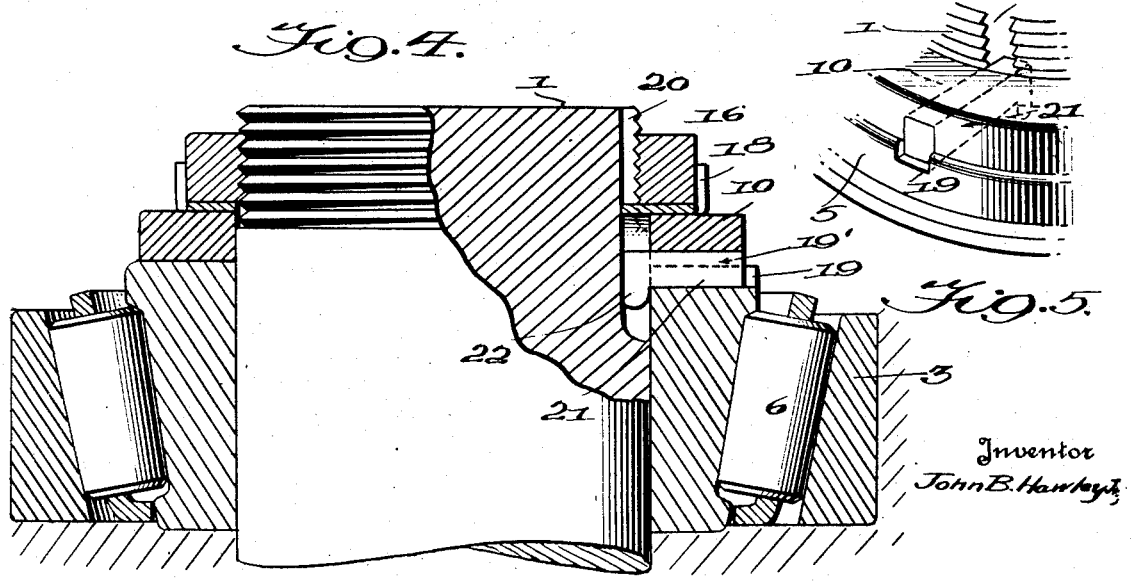
Inventor
John B. Hawley Jr.
By A. N. Dunn
Attorney Patented June 30, 1931

1,812,784

UNITED STATES PATENT OFFICE

JOHN B. HAWLEY, JR., OF MINNEAPOLIS, MINNESOTA

BEARING LOCKING DEVICE

Application filed March 20, 1929. Serial No. 348,607.

This invention relates to bearing assemblies, and especially to bearings for the ends of rotatable shafts. In the bearing forming the subject matter of this invention, the end of the shaft extends through two concentrically mounted rings, the outer ring being non-rotatably fixed to a support, and forming a stationary raceway, and the inner ring being secured to the shaft, and forming an inner raceway adapted to be secured to the shaft for rotation therewith. Between the two raceways is mounted a plurality of anti-friction rollers or bearings, here illustrated as elongated, and a circular retaining frame, having elongated slots, each adapted to permit extension therethrough of a portion of the periphery of a roller, is mounted concentrically with respect to the inner beveled surface of the outer raceway, whereby to retain said anti-friction members in proper alignment as they bear against and move around the outer surface of the inner raceway, and the parallel inner surface of the outer raceway.

The object of the invention is the provision of improved means for so securing the inner raceway to the shaft that it will rotate therewith.

Other objects of the invention will be made apparent in the following specification, when read in connection with the drawings forming a part thereof.

In said drawings:

Fig. 1 is a sectional view taken vertically through the two raceways, showing the shaft in full lines.

Fig. 2 is a reduced dis-assembled perspective view, showing the end of the shaft and one method of locking the inner raceway thereto.

Fig. 3 is an enlarged sectional detail of one side of the shaft, locking washer, and inner raceway, showing a locking key inserted in a key-way slot cut longitudinally in the end of the shaft, and into a key-way in the locking washer, and also showing a radial key mounted in a key-way formed in the washer and in its inner raceway.

Fig. 4 is a partial fragmentary view, partly in section, showing the complete assembly, and, Fig. 5 is a detail perspective view showing a locking key securing the lock-washer to the shaft, and also to the inner raceway.

Now referring specifically to the drawings, in which like reference numerals indicate like parts throughout the several views, and referring first to Fig. 1, the numeral 1 indicates a rotatable shaft having one end held in a bearing mounted on any support, such as 2. Suitably secured to the support 2, is an outer raceway 3, provided with inwardly and downwardly beveled walls 4, as here illustrated. An inner raceway 5 surrounds the end of the shaft 1, and is provided with a beveled track for the anti-friction rollers 6, in parallelism with the walls 4 of the outer raceway. The roller retaining frame 7 is best illustrated in Figs. 1 and 4, and comprises a frame-work consisting of upper and lower rims 8 and 9, connected by vertical bars, not shown, mounted in parallelism to the walls 4 and 5, and spaced at equal distances to permit the outer peripheries of the rollers 6 to project between the bars and contact said walls in the rotation of the shaft.

One means for locking the inner raceway 5 to the shaft 1, is illustrated in Fig. 1, in which the shaft is extended through said raceway, and the elements assembled as shown. It will be noted that, as illustrated in Figs. 1 and 2, a locking washer 10 surrounds the end of the shaft 1, above the inner raceway, and that the top surface of the latter is provided on each side with a downwardly and inwardly beveled recess or socket 11, adapted to receive a registering and similarly shaped tongue 12, formed on the lower surface of the lock washer 10. In addition thereto, the end of the shaft 1 is longitudinally recessed, as at 13, and a similar recess 14 is formed in the inner periphery of the lock washer 10, said recesses forming key-ways adapted to receive a key 15. A locking nut 16 is then screwed onto the end of the shaft 1, being held against rotation by a small locking washer 17 placed under said nut, and having upturned flanges 18 embracing the sides of the latter. It will be understood therefore that, when the washer 10 is secured in position as stated, rotation of the latter with respect to the inner raceway 5, is prevented by the recesses 11 and tongues 12, and that relative vertical movement between the washer and shaft is prevented by the lock nut 16.

A simpler method of locking the washer 10 to the raceway and to the shaft 1, is illustrated in Figs. 4 and 5. In this structure a radial key-way 19 is formed in the upper periphery of the inner raceway 5, registering with a similar key-way 19' in the washer 10, and leading into a key-way 20 formed longitudinally in the face of the shaft 1. A key 21, provided with a depending tongue 22, at the inner end of its lower face, is then inserted into the key-ways 19 and 19', and extended into the longitudinal key-way 20 in the shaft, to permanently lock the washer 10 against rotative movement with respect to the raceway 5 of the shaft, the lock nut 16 preventing any vertical movement of the assembly, and the tongue 22 retaining the key 21 against outward movement.

From the foregoing it will be obvious that I have provided a positive and efficient means for accomplishing the desired purpose of not only locking the inner raceway against rotation with respect to the shaft, but have also provided additional means for preventing relative vertical movement between the raceway and shaft.

Difficulties have heretofore been encountered in cutting an axial key-way in the inner race of a bearing, because such operation subjects the race to a distorting wedge action, resulting in a non-circular track for the bearings. If the key is loose it permits oscillation of the race, and an axial key which is too tight prevents an accurate adjustment of the race longitudinally of the shaft. The key-way must be cut before the raceway is properly hardened, and it then distorts after or during the hardening operation, but a radial key-way may be easily and economically ground in a hardened and ground-finished raceway.

Modifications of the structure herein described may be suggested to those skilled in the art, but my invention covers all embodiments falling fairly within the scope of the appended claims.

I claim:—

1. In combination with a rotatable shaft extended through a raceway of an anti-friction bearing, a washer surrounding the shaft, and means locking said washer to said raceway and to said shaft, said means comprising a key extended through aligned slots axially formed in the washer and raceway, and into an aperture provided in said shaft.

2. In combination with a rotatable shaft extended through a raceway of an anti-friction bearing, a washer surrounding the shaft, and means locking said washer to said raceway and to said shaft, said means comprising a key extended through aligned slots axially formed in the washer and raceway and into an aperture provided in said shaft, and a lock nut for preventing movement of the washer longitudinally of said shaft.

JOHN B. HAWLEY, Jr.